(12) United States Patent
Simons

(10) Patent No.: US 10,041,452 B2
(45) Date of Patent: Aug. 7, 2018

(54) ARRANGEMENT FOR ATTACHING A CONTROL VALVE TO A FLOW CHANNEL HOUSING OF AN INTERNAL COMBUSTION ENGINE

(71) Applicant: PIERBURG GMBH, Neuss (DE)

(72) Inventor: Norbert Simons, Duesseldorf (DE)

(73) Assignee: PIERBURG GMBH, Neuss (DE)

( * ) Notice: Subject to any disclaimer, the term of this patent is extended or adjusted under 35 U.S.C. 154(b) by 71 days.

(21) Appl. No.: 15/121,041

(22) PCT Filed: Feb. 9, 2015

(86) PCT No.: PCT/EP2015/052600
§ 371 (c)(1),
(2) Date: Aug. 24, 2016

(87) PCT Pub. No.: WO2015/128175
PCT Pub. Date: Sep. 3, 2015

(65) Prior Publication Data
US 2017/0009711 A1    Jan. 12, 2017

(30) Foreign Application Priority Data

Feb. 26, 2014  (DE) ........................ 10 2014 102 524

(51) Int. Cl.
*F16K 27/02*    (2006.01)
*F02M 26/65*    (2016.01)
(Continued)

(52) U.S. Cl.
CPC ........... *F02M 26/65* (2016.02); *F02B 37/186* (2013.01); *F02M 26/11* (2016.02); *F02M 26/12* (2016.02);
(Continued)

(58) Field of Classification Search
CPC ...... F16K 27/00; F16K 27/02; F16K 27/0218; F16K 27/12; F02M 26/58; F02M 26/67
(Continued)

(56) References Cited

U.S. PATENT DOCUMENTS 1,679,218 A  *  7/1928  Huff ........................ F16K 17/04
                                                       137/338
4,098,490 A  *  7/1978  Morrison ................ F16K 27/12
                                                       220/240
(Continued)

FOREIGN PATENT DOCUMENTS

DE           103 44 218 A1     4/2005
DE      10 2007 000 217 A1    10/2007
(Continued)

OTHER PUBLICATIONS

"Common Rail Diesel", www.hella.com, pp. 11-12 (2010, retrieved Apr. 24, 2015).

*Primary Examiner* — Matthew W Jellett
(74) *Attorney, Agent, or Firm* — Norman B. Thot

(57) ABSTRACT

An arrangement for attaching a control valve to a flow channel housing of an internal combustion engine which includes an insertion housing part which projects into the flow channel housing. The arrangement includes an actuator housing, an actuator arranged in the actuator housing, a housing plate which rests on the flow channel housing, screws, and a collar flange which radially surrounds the housing plate. The insertion housing part extends on a first side of the housing plate and the actuator housing extends on a second opposite side of the housing plate. The collar flange comprises a screw hole pattern arranged thereon and through-holes arranged therein. The screw hole pattern corresponds to a connecting bore pattern of the flow channel housing. The control valve is attached to the flow channel (Continued)

housing via the screws being inserted through the through-holes of the collar flange.

11 Claims, 3 Drawing Sheets

(51) Int. Cl.
    *F02B 37/18*     (2006.01)
    *F02M 26/12*     (2016.01)
    *F02M 26/11*     (2016.01)
    *F02M 26/54*     (2016.01)
    *F02M 26/67*     (2016.01)
    *F02M 26/52*     (2016.01)
    *F16K 27/00*     (2006.01)

(52) U.S. Cl.
    CPC ............ *F02M 26/52* (2016.02); *F02M 26/54* (2016.02); *F02M 26/67* (2016.02); *F16K 27/00* (2013.01); *F16K 27/02* (2013.01); *Y02T 10/144* (2013.01)

(58) Field of Classification Search
    USPC .............................................. 251/129.11, 363
    See application file for complete search history.

(56) References Cited

U.S. PATENT DOCUMENTS

| | | | |
|---|---|---|---|
| 4,630,445 A | 12/1986 | Parker | |
| 4,809,742 A * | 3/1989 | Grau | G01B 7/003 |
| | | | 137/554 |
| 5,494,255 A * | 2/1996 | Pearson | F02M 26/48 |
| | | | 123/568.26 |
| 5,685,519 A * | 11/1997 | Bircann | F16K 31/0655 |
| | | | 251/129.15 |
| 5,746,058 A | 5/1998 | Vertanen | |
| 2001/0032950 A1* | 10/2001 | Bircann | F16K 27/0245 |
| | | | 251/129.15 |
| 2002/0157648 A1 | 10/2002 | Reiter | |
| 2002/0174858 A1* | 11/2002 | Kato | F02B 47/08 |
| | | | 123/568.12 |
| 2007/0240690 A1 | 10/2007 | Nanba | |
| 2014/0263366 A1* | 9/2014 | Breuer | F17C 1/005 |
| | | | 220/586 |
| 2015/0122351 A1* | 5/2015 | Kuehnel | F02B 37/186 |
| | | | 137/375 |

FOREIGN PATENT DOCUMENTS

| | | |
|---|---|---|
| DE | 10 2009 050 182 A1 | 5/2011 |
| DE | 10 2012 004 937 A1 | 9/2013 |
| DE | 10 2012 104 612 A1 | 12/2013 |
| EP | 1 394 399 A1 | 3/2004 |
| FR | 2.041.950 A | 2/1971 |
| JP | 61-247005 A | 11/1986 |
| JP | 7-224963 A | 8/1995 |
| JP | 10-122404 A | 5/1998 |
| WO | WO 01/48370 A1 | 7/2001 |

* cited by examiner

ARRANGEMENT FOR ATTACHING A CONTROL VALVE TO A FLOW CHANNEL HOUSING OF AN INTERNAL COMBUSTION ENGINE

CROSS REFERENCE TO PRIOR APPLICATIONS

This application is a U.S. National Phase application under 35 U.S.C. § 371 of International Application No. PCT/EP2015/052600, filed on Feb. 9, 2015 and which claims benefit to German Patent Application No. 10 2014 102 524.5, filed on Feb. 26, 2014. The International Application was published in German on Sep. 3, 2015 as WO 2015/128175 A1 under PCT Article 21(2).

FIELD

The present invention relates to an arrangement for attaching a control valve to a flow channel housing of an internal combustion engine, the arrangement comprising an insertion housing part which projects into a flow channel housing, an actuator housing in which an actuator is arranged, and a housing plate which rests on the flow channel housing and from which the insertion housing part extends on a first side and the actuator housing extends on the opposite side.

BACKGROUND

Control valves of this type are used, for example, as exhaust return valves, exhaust flaps, or waste gate valves in internal combustion engines. Such valves can either be so-called plug-in valves having formed on them the housing part to be inserted into the flow channel housing, one or a plurality of inlets and outlets and one or a plurality of valve seats arranged therebetween, or valves whose housing merely comprises a cylindrical plug-in part from which the control body projects into the channel to be governed. The passage surrounded by the valve seat is governed by this control body, particularly a valve disk formed on a valve rod which is operated, via a transmission, for example, by an electric motor in order to control the quantity of fluid between the inlet and the outlet so that the housing with the electric motor functions as the actuator of the control valve.

Attachment of these control valves to the flow channel housing is normally performed with the aid of a flange which comprises a hole pattern corresponding to the hole pattern on the flow channel housing so that the valve can be fastened to the flow channel housing using screws. The flange is usually formed in one piece with the insertable housing part and at least a part of the actuator housing of the valve.

A control valve for internal combustion engines which is formed as a plug-in valve is described in DE 10 2012 104 612 A1. This control valve comprises an axial inlet and a radial outlet which are formed on the insertion housing part. The insertion housing is formed in one piece with an actuator housing part surrounding the transmission on at least two sides, wherein, between the actuator housing part and the insertion housing part, a flange plate is arranged which is formed in one piece therewith, particularly via a pressure casting from a light metal. The screw hole pattern fitting to the connection flange of the flow channel housing is formed on the flange plate so that, in the regular case, the control valve will be fastened to the flow channel housing by screws, normally with interposition of a sealing.

The above arrangement has the disadvantage that the entire pressure-cast housing must be newly adapted with a different bore hole pattern for each new customer so that new shapes must always be generated to produce the valve housing, irrespective of the quantity produced.

SUMMARY

An aspect of the present invention is to provide an arrangement for attaching a control valve to a flow channel housing of an internal combustion engine where it is possible to always use the same valve housing even for different connecting bore patterns. An additional aspect of the present invention is to perform the manufacturing and assembly processes as simply and inexpensively as possible, and to provide for a sufficient leak tightness to the outside.

In an embodiment, the present invention provides an arrangement for attaching a control valve to a flow channel housing of an internal combustion engine which comprises an insertion housing part configured to project into the flow channel housing. The arrangement includes an actuator housing, an actuator arranged in the actuator housing, a housing plate configured to rest on the flow channel housing, screws, and a collar flange configured to radially surround the housing plate. The insertion housing part extends on a first side of the housing plate and the actuator housing extends on a second side of the housing plate which is arranged is opposite to the first side. The collar flange comprises a screw hole pattern arranged thereon and through-holes arranged therein. The screw hole pattern corresponds to a connecting bore pattern of the flow channel housing. The control valve is attached to the flow channel housing via the screws being inserted through the through-holes of the collar flange.

BRIEF DESCRIPTION OF THE DRAWINGS

The present invention is described in greater detail below on the basis of embodiments and of the drawings in which.

DETAILED DESCRIPTION

Figure 1:
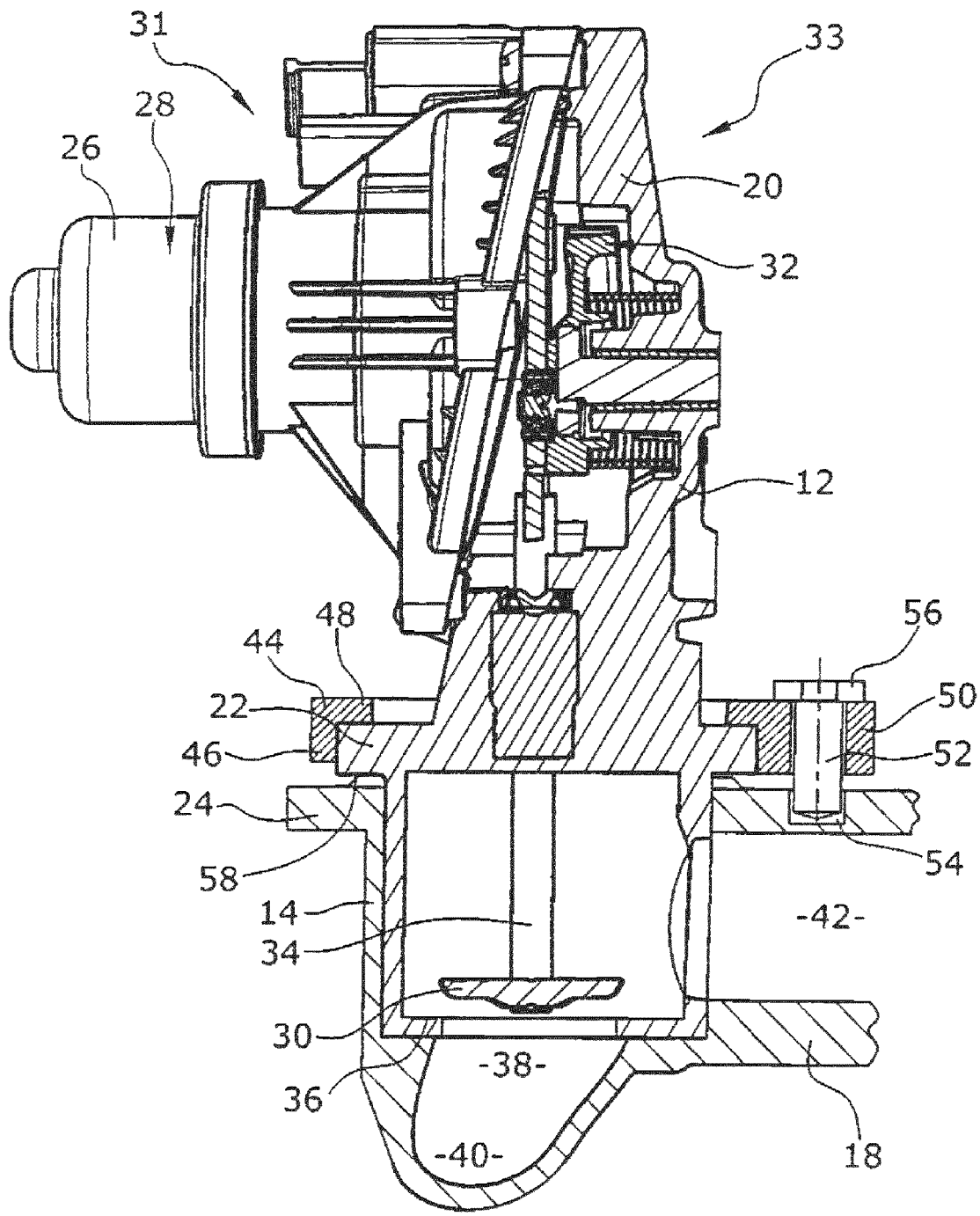
FIG. 1 shows a lateral sectional view of an arrangement for attaching another control valve to a flow channel housing as provided by the present invention.
Figure 2:
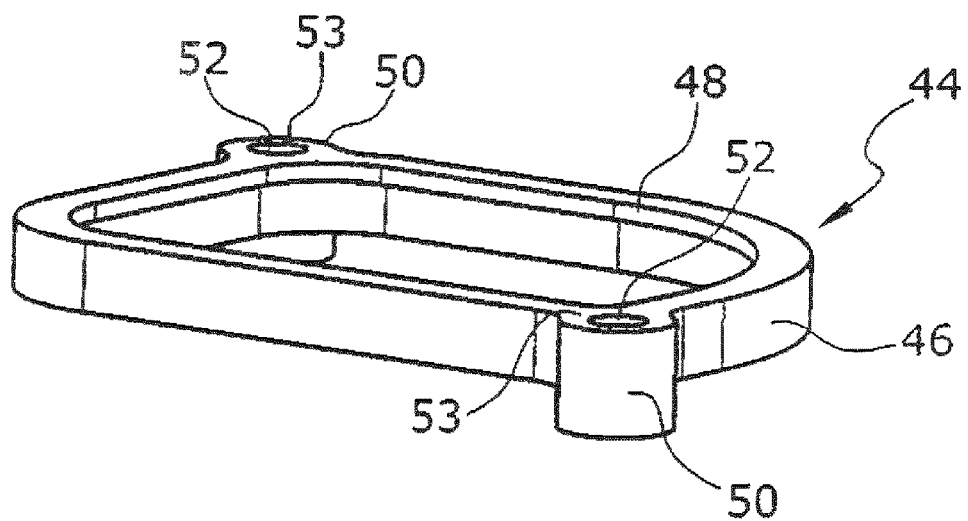
FIG. 2 shows perspective view of a collar flange of the present invention.

Since the housing plate is surrounded radially by a collar flange on which a screw hole pattern is formed that corresponds to a connecting bore pattern of the flow channel housing, with the control valve being attached to the flow channel housing via screws which are inserted through through-holes of the collar flange, the control valve can be produced as a standard component irrespective of the connecting bore pattern of the flow channel housing. Only the separately produced collar flange must be adapted. Manufacturing costs can thus be saved while the assembly process remains easy and a secure sealing to the outside can also be provided.

In an embodiment of the present invention, the housing plate, the insertion housing part, and an actuator housing part extending from the housing plate can, for example, be a light-metal casting, wherein the circumference of the actuator housing part extending from the housing plate is smaller than the inner circumference of the collar flange.

The costs for assembly are reduced via the one-pieced configuration of the housing components. The light metal casting material allows for a use in thermally highly-stressed environments. The collar flange can be conveniently shifted onto the base plate from the side of the actuator housing part, thus facilitating the assembly process.

In an embodiment of the present invention, an axial section of the collar flange facing toward the flow channel housing can, for example, have an inner circumference substantially corresponding to the outer circumference of the housing plate. The base plate is correspondingly entirely surrounded by the collar flange with a radial abutment. Shifting of the valve housing is thus reliably prevented by a form-locking engagement in a radial direction.

In an embodiment of the present invention, an axial section of the collar flange facing away from the flow channel housing can, for example, have a smaller inner circumference than the axial section facing toward the flow channel housing, wherein the axial section facing away from the flow channel housing is in axial abutment on the housing plate. Axial movement of the valve housing in the opening of the flow channel housing is thereby prevented. There is achieved a complete relative fixing between the collar flange and the base plate and thus the valve housing.

In an embodiment of the present invention, the axial section facing toward the flow channel housing can, for example, have a lower axial height than the housing plate. It is thereby safeguarded that, when tightening the screws, the axial section facing away from the flow channel housing is arranged in a tensioned state against the base plate, thus excluding even slight movements in an axial direction. Radial movements on the flow channel housing will also be avoided by clamping the base plate in position in this manner.

In an embodiment of the present invention, a sealing can, for example, be arranged between the flow channel housing and the housing plate, the sealing being elastically deformed by the attachment of the control valve by the screws inserted through the through holes of the collar flange. The force having the clamping effect is thereby increased by the screw attachment of the collar flange and full leak tightness from the flow channel housing to the outside and vice versa is provided.

In an embodiment of the present invention, the sealing can, for example, be a metal bead sealing, thus also allowing for use in thermally highly-stressed environments. Using a metal bead sealing also allows for a very good sealing effect.

In an embodiment of the present invention, the through holes in the collar flange are formed on screw domes whose axial height toward the flow channel housing, when measured from the axial end of the housing plate, is slightly smaller than the sum of the axial heights of the housing plate and of the sealing. Sufficient clamping attachment of the collar flange to the base plate will thereby be safeguarded. The clamping attachment is, however, only effected via the screw attachment points so that tolerance problems, particularly due to deflection of the flange, will be avoided by the screw attachment.

In an embodiment of the present invention, the axial height of the screw domes can, for example, be larger than the axial height of the rest of the circumference of the collar flange. The clamping attachment is thus effected only via the screw attachment points so that tolerance problems in relation to the base plate, particularly due to deflection of the flange, will be avoided by the screw attachment.

For additional improvement of the attachment of the control valve on the flow channel housing, the collar flange is fastened to the housing plate in a manner securing it from being detached so that the control valve can be inserted into the opening with the flange. Such a securement can be mechanically realized by screws or rivets, or through material bonding by welding.

To allow for inexpensive production, the collar flange is a pressure-cast, a punched, a stamp-bent, or an embossed part. These components can be produced with high accuracy and have sufficient strength.

In an embodiment of the present invention, an inlet and an outlet can, for example, be formed on the insertion housing part, wherein a control body is operative to govern a passage between the inlet and the outlet, the control body being adapted to be set in motion via the actuator. Such a plug-in valve can be produced and installed in a particularly simple manner since the entire valve can be pre-assembled at the valve seat prior to insertion into the flow channel housing.

An arrangement for attaching a control valve to a flow channel housing of an internal combustion engine is thus provided which, while produced in a simple and inexpensive manner, will provide a reliable and close attachment of the control valve for different connecting bore patterns on the flow channel housing and thus for different customer requests. The housing of the control valve can accordingly be used as a standard component for various applications without the need for modifications.

An exemplary embodiment of an arrangement for attaching a control valve to a flow channel housing of an internal combustion engine as provided by the present invention is shown in the drawings and will be described hereunder with reference to the attachment of an exhaust return valve.

The control valve shown in FIG. 1, designed as a plug-in valve, comprises a one-pieced valve housing 12 produced by pressure casting from a light metal while, in case of low gas temperatures, the valve housing 12 can also be made of plastic. Valve housing 12 comprises an insertion housing part 14 projecting into a flow channel delimited by a flow channel housing 18, and an actuator housing part 20 arranged outside the flow channel housing 18. Between actuator housing part 20 and insertion housing part 14, the valve housing 12 comprises a housing plate 22 formed in one piece with actuator housing part 20 and insertion housing part 14, by which the valve housing 12 is supported on a connecting flange 24 of flow channel housing 18.

Actuator housing part 20 has fastened to it an electric motor housing 26 for accommodating an electric motor 28 serving to drive a control body 30. Actuator housing part 20 together with electric motor housing 26 forms an actuator housing 31 of the control valve. The drive of the control valve is performed by powering the electric motor 28 which, with a transmission 32 arranged downstream thereof, forms an actuator 33. The resulting rotation of a motor shaft (not shown in the drawings) is converted, by the transmission 32 which also is arranged in the actuator housing 31, into a translatory movement of a valve rod 34 having the control body 30 attached to its end.

The control body 30 governs a flow passage 38, surrounded by a valve seat 36, which is formed between an inlet 40 leading into insertion housing part 14 and an outlet 42 leading from insertion housing part 14 into the following flow channel so that, when the control body 30 rests on the valve seat 36, a flow connection between the inlet 40 and the outlet 42 is interrupted and will be cleared by lifting the control body 30 off the valve seat 36.

According to the present invention, attachment of the valve seat and/or of the valve housing 12 is realized by a collar flange 44. The collar flange 44 comprises a first axial section 46 facing toward the surface of connecting flange 24 of flow channel housing 18, and, following the first axial section 46, a second axial section 48 arranged facing away from the flow channel housing 18. The inner circumference of first axial section 46 substantially corresponds to the outer circumference of housing plate 22 or is slightly smaller. A clearance fit can, for example, be provided between the housing plate 22 and the first axial section 46. The inner circumference of the second axial section 48 is smaller than that of housing plate 22 so that a radially inner area of second axial section 48 of collar flange 44 is in abutment against housing plate 22 from the side opposite to flow channel housing 18. In the present exemplary embodiment, the outer circumferences of the first axial section 46 and the second axial section 48 are identical.

Collar flange 44 is provided with screw domes 50 comprising through-holes 52. The screw hole pattern 53 of the through-holes 52 corresponds to a connecting bore pattern formed by threaded bores 54 in the surface of connecting flange 24 of flow channel housing 18. In correspondence thereto, after insertion of the valve housing 12 into the flow channel housing 18, the housing plate 22 and thus the valve housing 12 can be fastened to the connecting flange 24 of flow channel housing 18 by collar flange 44 with screws 56. The outer diameter of collar flange 44 must of course be adapted to the connecting flange 24 of flow channel housing 18 so as to be able to produce a screw hole pattern 53 corresponding to the respective connecting bore pattern.

To provide that this attachment will completely prevent a movement of valve housing 12 relative to flow channel housing 18 and that the flow channel is reliably sealed to the outside, an elastic sealing in the form of a metal bead sealing 58 is arranged between connecting flange 24 and housing plate 22, the metal head sealing 58 being clamped when the screws 56 are tightened. This clamping in an axial direction is achieved in that the height of the first axial section 46 of collar flange 44 and of the screw domes 50 is at least slightly smaller than the sum of the height of the housing plate 22 and of the thickness of the metal bead sealing 58 in the fully clamped state, or is slightly smaller than the height of housing plate 22. The height of the connecting screw domes 50 is also slightly larger than the height of the rest of the collar flange 44 so that, for avoidance of tolerance problems, the force application during the clamping process will take place largely via the screw attachment points. Axial movement is thus avoided by the screw attachment, and radial movement is avoided by the lateral abutment of the housing plate 22 on the fastened collar flange 44.

Figure 3:
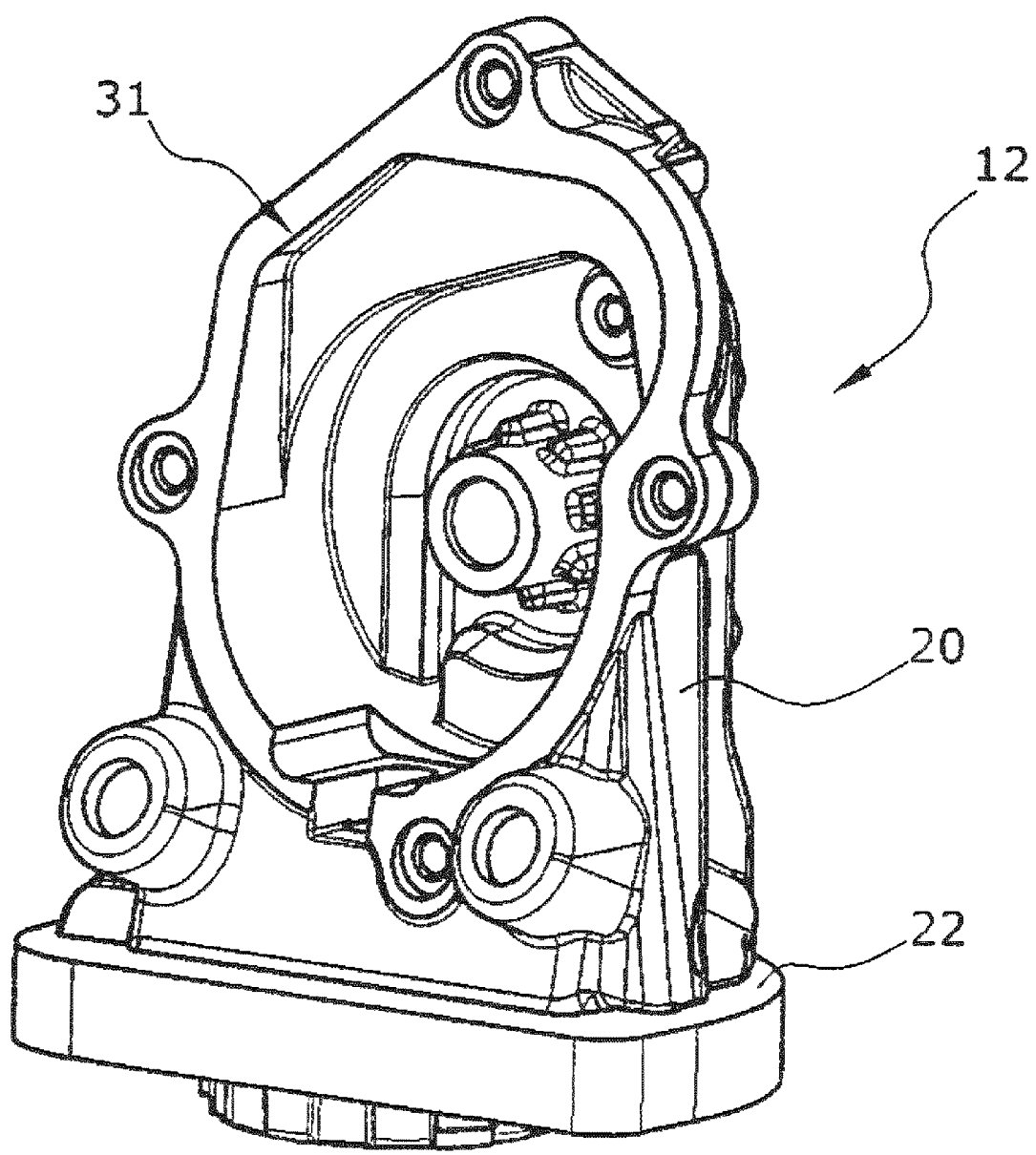
FIG. 3 shows a perspective exploded view of a control valve with a collar flange.

As is shown in FIG. 3, the design of valve housing 12 can also be provided to the effect that the insertion housing part 14 of valve housing 12 only has a short length so that the control valve will govern a valve seat 36 formed in the flow channel housing 18 and the insertion housing part 14 will only radially close, to the largest extent, an opening in the flow channel housing 18. FIG. 3 also shows that the collar flange 44 will, for example, prior to mounting the electric motor housing 26, be placed from above over the actuator housing part 20 of valve housing 12 onto the housing plate 22. For ease of transport, the collar flange 44 can here be fastened in advance by welding points. The electric motor 28 with the transmission 32, as well as the electric motor housing 26 and the valve rod 34 with control body 30, will only thereafter be mounted. The completely assembled control valve inclusive of collar flange 44 will then be shifted by the insertion housing part 14 into the flow channel housing 18 and be fastened thereto by screws 56.

By using an arrangement provided by the present invention, comprising a collar flange of the above design for attachment of a control valve to a flow channel housing, it is possible to use a standardized valve housing for different connecting bore patterns of the flow channel housings, for example, for different customer requirements, thus allowing for the use of identical molds, drawings and assembly lines. An adaptation will then be performed exclusively by altering the collar flange, to be additionally mounted, with its screw hole pattern, which collar flange can be produced not only as a pressure-cast part, but also as a punched, stamp-bent, or embossed part, and which can be changed during production with low expenditure. A sufficient sealing effect is nonetheless safeguarded.

It should be evident that the present invention is not restricted to the described exemplary embodiments but that various modifications are possible. For example, it is also possible to provide the connecting flange with through-holes so that a screw connection is established from the opposite side. It may also be favorable in some cases to effect a full-surface support of the collar flange with uniform force application, provided that sufficiently narrow tolerances are realized, thus achieving a uniform clamping of the selected sealing. This arrangement is also suited for flap valves. Reference should be had to the appended claims.

What is claimed is:

1. An arrangement for attaching a control valve to a flow channel housing of an internal combustion engine, the arrangement comprising:
    an insertion housing part configured to project into the flow channel housing;
    an actuator housing;
    an actuator arranged in the actuator housing;
    a housing plate configured to rest on the flow channel housing, the insertion housing part extending on a first side of the housing plate and the actuator housing extending on a second side of the housing plate which is arranged opposite to the first side;
    screws; and
    a collar flange configured to radially surround the housing plate, the collar flange comprising a screw hole pattern arranged thereon and through-holes arranged therein,
    wherein,
    the screw hole pattern corresponds to a connecting bore pattern of the flow channel housing,
    the control valve is attached to the flow channel housing via the screws being inserted through the through-holes of the collar flange,
    the actuator housing comprises an actuator housing part configured to extend from the housing plate, the actuator housing part comprising a circumference,
    the housing plate, the insertion housing part and the actuator housing part are provided as a one piece light-metal casting,
    the collar flange comprises an inner circumference, and
    the circumference of the actuator housing part is smaller than the inner circumference of the collar flange.

2. The arrangement as recited in claim 1, wherein,
    the collar flange comprises a first axial section configured to face toward the flow channel housing, the first axial section comprising an inner circumference,
    the collar flange comprises an outer circumference, and
    the inner circumference of the first axial section substantially corresponds to the outer circumference of the housing plate.

3. The arrangement as recited in claim 2, wherein,
the collar flange further comprises a second axial section configured to face away from the flow channel housing and to axially abut on the housing plate, the second axial section comprising an inner circumference, and
the inner circumference of the second axial section is smaller than the inner circumference of the first axial section.

4. The arrangement as recited in claim 2, wherein,
the first axial section further comprises an axial height,
the housing plate comprises an axial height, and
the axial height of the first axial section is less than the axial height of the housing plate.

5. The arrangement as recited in claim 1, further comprising:
a sealing arranged between the flow channel housing and the housing plate, the sealing being configured to be elastically deformed by the attachment of the control valve via the screws being inserted through the through holes of the collar flange (44).

6. The arrangement as recited in claim 5, wherein the sealing is a metal bead sealing.

7. The arrangement as recited in claim 5, wherein,
the housing plate comprises an axial end and an axial height,
the sealing comprises an axial height,
the collar flange further comprises screw domes which comprise an axial height oriented toward the flow channel housing as measured from the axial end of the housing plate, the through holes being formed on the screw domes, and
the axial height of the screw domes is less than a sum of the axial height of the housing plate and the axial height of the sealing.

8. The arrangement as recited in claim 7, wherein,
the axial height of the screw domes is greater than an axial height of a rest of the circumference of the collar flange.

9. The arrangement as recited in claim 1, wherein the collar flange is non-detachably fastened to the housing plate.

10. The arrangement as recited in claim 1, wherein the collar flange is provided as a pressure-cast part, a punched part, a stamp-bent part, or an embossed part.

11. The arrangement as recited in claim 1, wherein the insertion housing part comprises an inlet and an outlet, the arrangement further comprising:
a control body configured to govern a passage between the inlet and the outlet and to be moved by the actuator.

* * * * *